(12) United States Patent
Mattsson et al.

(10) Patent No.: US 9,237,006 B2
(45) Date of Patent: Jan. 12, 2016

(54) TABLE-CONNECTED TOKENIZATION

(71) Applicant: Protegrity Corporation, George Town, Grand Cayman (KY)

(72) Inventors: Ulf Mattsson, Cos Cob, CT (US); Yigal Rozenberg, Wilton, CT (US); Vichai Levy, Norwalk, CT (US)

(73) Assignee: Protegrity Corporation, Grand Cayman (KY)

( * ) Notice: Subject to any disclaimer, the term of this patent is extended or adjusted under 35 U.S.C. 154(b) by 117 days.

(21) Appl. No.: 14/042,314

(22) Filed: Sep. 30, 2013

(65) Prior Publication Data

US 2015/0095252 A1 Apr. 2, 2015

(51) Int. Cl.
*H04L 9/06* (2006.01)
*G06Q 50/26* (2012.01)
*H04L 29/06* (2006.01)

(52) U.S. Cl.
CPC ............. *H04L 9/06* (2013.01); *G06Q 50/265* (2013.01); *H04L 63/0428* (2013.01); *H04L 63/0807* (2013.01)

(58) Field of Classification Search
CPC .......................................... H04L 9/06–9/0693
USPC ........................................................ 726/26
See application file for complete search history.

(56) References Cited

U.S. PATENT DOCUMENTS

| 5,623,548 | A * | 4/1997 | Akiyama et al. ............. 380/28 |
| 7,197,765 | B2 * | 3/2007 | Chan et al. .................... 726/8 |
| 7,684,568 | B2 * | 3/2010 | Yonge, III ............ G06F 21/606 380/262 |
| 9,047,461 | B2 * | 6/2015 | Horst ................. H04L 63/0471 |
| 2007/0086587 | A1 * | 4/2007 | Farahat ............... G06Q 10/107 380/28 |
| 2008/0084995 | A1 * | 4/2008 | Rodgers ........................ 380/28 |
| 2008/0137841 | A1 * | 6/2008 | Jajodia .......................... 380/28 |
| 2011/0154466 | A1 * | 6/2011 | Harper et al. .................. 726/9 |
| 2011/0213807 | A1 * | 9/2011 | Mattsson ..................... 707/802 |
| 2011/0283110 | A1 * | 11/2011 | Dapkus et al. ............... 713/182 |
| 2013/0198851 | A1 * | 8/2013 | Spies et al. ..................... 726/26 |

* cited by examiner

*Primary Examiner* — Dede Zecher
*Assistant Examiner* — Vadim Savenkov
(74) *Attorney, Agent, or Firm* — Fenwick & West LLP

(57) ABSTRACT

A tokenization system tokenizes sensitive data to prevent unauthorized entities from accessing the sensitive data. The tokenization system accesses sensitive data, and retrieves an initialization vector (IV) from an IV table using a first portion of the sensitive data. A second portion of the sensitive data is modified using the accessed initialization vector. A token table is selected from a set of token tables using a third portion of the sensitive data. The modified second portion of data is used to query the selected token table, and a token associated with the value of the modified second portion of data is accessed. The second portion of the sensitive data is replaced with the accessed token to form tokenized data.

20 Claims, 5 Drawing Sheets

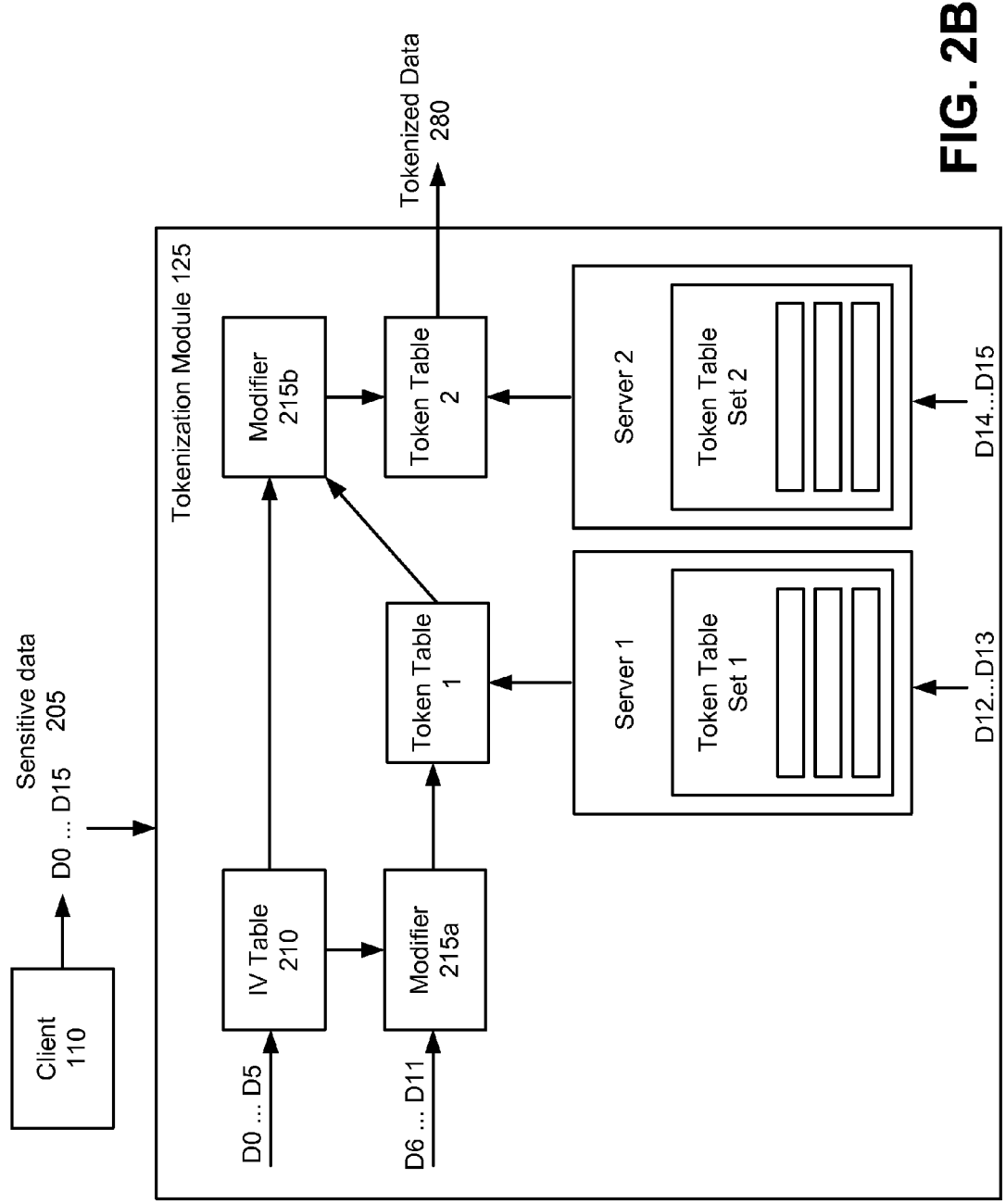

TABLE-CONNECTED TOKENIZATION

FIELD OF ART

This application relates to the field of data protection, and more specifically to the protection of information using static tokenization.

BACKGROUND

Many websites, services, and applications implement data protection techniques. Certain techniques involve the use of an encryption key or password that can be subject to interception or brute force guessing. Other methods may protect data but require extensive computing resources to encode and decode data. Such methods often fail to utilize various data format advantages when protecting the data. In addition, such methods often result in the re-use of data protection "secrets", such as encryption keys, encryption algorithms, and the like. This makes such methods particularly vulnerable to hacking or compromise. Thus, it may be advantageous to implement data protection techniques that minimize the re-use of data protection secrets while bolstering the protection of the data.

SUMMARY

A tokenization system tokenizes sensitive data prior to transmission to other remote devices and systems, thereby preventing unauthorized entities from accessing the sensitive data during the transmission. The tokenization system receives the sensitive data to be tokenized from a client. The tokenization system can use a first portion of the sensitive data to generate or retrieve an initialization vector (IV). The IV can be retrieved from one or more IV tables. The IV tables can include one or more columns of IVs and one index column. Each index column entry is mapped to an IV in each IV column.

Upon accessing one or more IVs, the tokenization system may use the IVs to modify a second portion of the sensitive data to generate a modified data. The modified data may then be tokenized by accessing one or more tokens from one or more token tables based on the modified data. In one embodiment, one or more token tables are selected from one or more sets of token tables based on a third portion of the sensitive data. The token table sets can be stored on physically separate servers, and each selected token table can be stored on a second server.

The tokenization system tokenizes the modified data using the selected token tables by querying the token tables using the first portion of the sensitive data. For instance, a first token can be retrieved from the first token table by querying a first token table with the first portion of sensitive data. A second token can be retrieved from a second token table by querying the second token table with the first token, and so on. A final token can be retrieved from a final token table, and the first portion of the sensitive data can be replaced with the final token, forming tokenized data. Hence, by querying a token table using the token obtained from querying a previous token table, table connected tokenization can be used to securely tokenize data.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 2a-2c illustrate example data flows within the tokenization system of FIG. 1, according to one or more embodiments.

Figure 1:
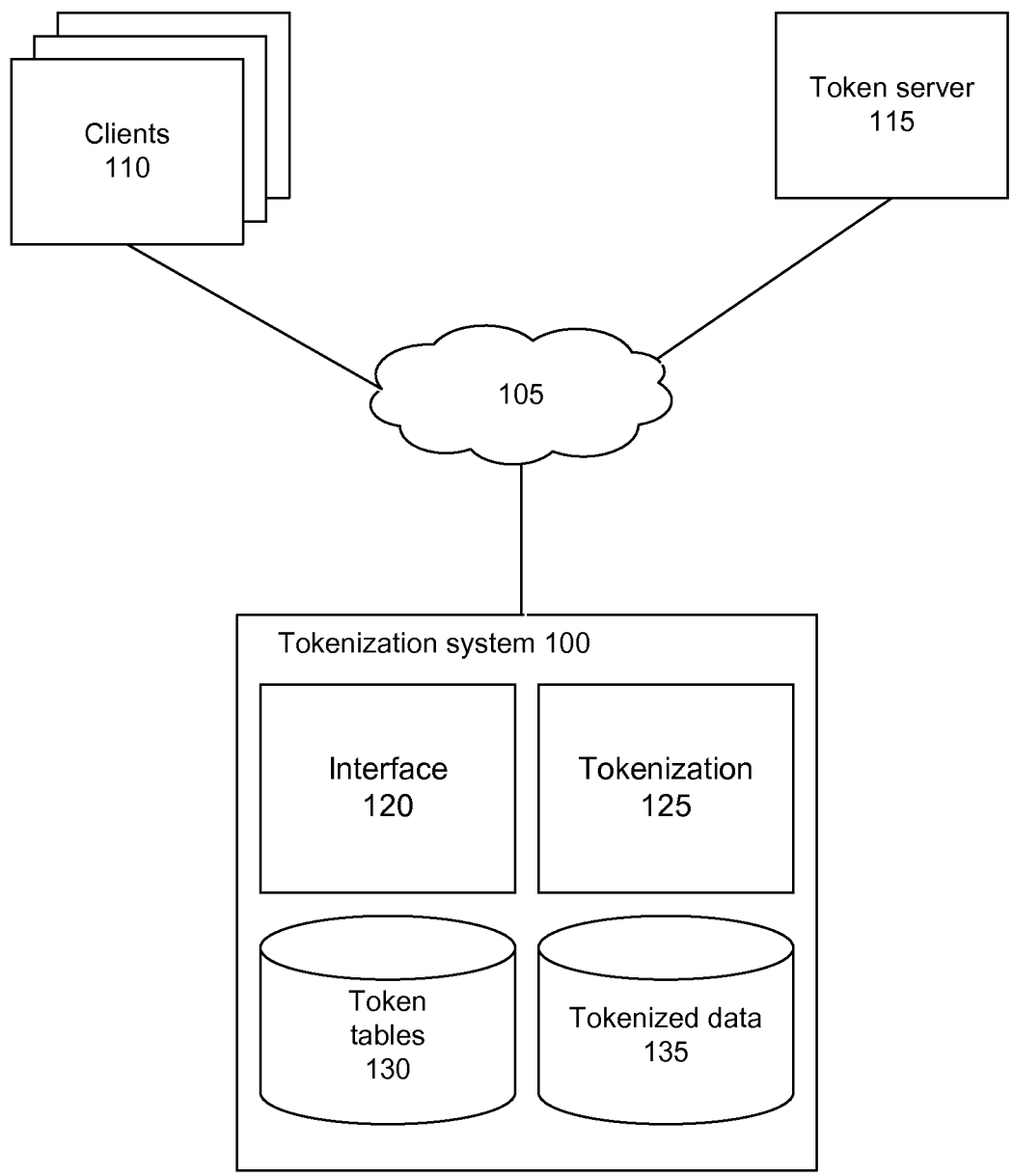
FIG. 1 is a system diagram for a tokenization environment, according to one embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein. Further, references to singular nouns (e.g., "token," "table," "portion") are to be understood to include their plural forms (e.g., "tokens," "tables," "portions"), and reference to plural nouns are to be understood to include their singular forms, as permitted by the context.

Tokenization Overview

The transmission and storage of sensitive data, such as passwords, credit card numbers, social security numbers, bank account numbers, driving license numbers, transaction information, date information, etc, can be challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column.

In some embodiments, to increase the security of tokenization, sensitive data can be tokenized two or more times using the same or additional token tables. This process is referred to as tokenization "chaining". For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token is generated and included in a token table entry each time sensitive data is tokenized. The new token can be generated randomly, can be randomly selected from among a set of values, or can be generated via any other suitable means. A seed value can be used to generate tokens, to select a set of values from which to select a token from among multiple sets of values, or to randomly select a value from among a set of values for use as the token. It should be noted that as used herein, "randomly" can refer to pseudo-randomly or substantially randomly. The seed value can include a portion of data being tokenized.

In some embodiments, a DLT can map portions of sensitive data being replaced by a token to a token. The DLT can include the entire sensitive data (including portions of the sensitive data that are not replaced by a token), and the DLT can indicate the portion of the sensitive data being replaced by the token and can map the portion to the token. DLTs can in some configurations provide a higher level of security compared to SLT but require the storage and/or transmission of a large amount of data associated with each of the generated token tables. It should be noted that DLT tokenization can be used to tokenize data according to the principles described above with regards to SLT tokenization. Although the methods described herein can apply to DLT tokenization, the remainder of the description will be limited to SLT tokenization for the purposes of simplicity.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data. It should be noted that although the remainder of the description herein refers to accessing an IV from and IV table, an IV can be accessed from a set of one or more IVs of any organization according to the principles herein.

Tokenization System Overview

FIG. 1 is a system diagram for a tokenization environment, according to one embodiment. The environment of FIG. 1 includes a tokenization system 100, a plurality of clients 110, and a token server 115, communicatively coupled via a network 105. Each client 110 can be associated with a retailer, business, or other organization, though it should be noted that clients can also be associated with individual users or any other suitable entity. A client can receive sensitive data, for instance a credit card number or other account number during the course of a transaction with a user, and the tokenization system 100 can tokenize all or part of the sensitive data. It should be noted that in other embodiments, the environment of FIG. 1 includes additional or different components.

Each client 110 can include a computing device capable of processing data as well as transmitting data to and receiving data from the other modules of FIG. 1 via the network 105. For example, the client can include a desktop computer, laptop computer, smart phone, tablet computing device, server, payment terminal, or any other device having computing and data communication capabilities. Each computing device includes one or more processors, memory, storage, and networking components. Each client is coupled to the network and can interact with other modules coupled to the network using software such as a web browser or other application with communication functionality. Such software can include an interface for communicating with the other modules via the network.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

Each client is configured to receive sensitive data and to provide the sensitive data to the tokenization system 100 for tokenization. It should be noted that while the tokenization system is illustrates separately from the clients, in some embodiments, the tokenization system is included within a client. The tokenization system 100 is a computing device configured to receive the sensitive data and to tokenize the received sensitive data. For example, the tokenization system can be a server, a payment system, a security computer, and the like.

The tokenization system 100 includes an interface module 120, a tokenization module 125, a token tables storage module 130, and a tokenization data storage module 135. In other embodiments, the tokenization system includes components other than those illustrated in FIG. 1. The interface module is configured to provide an interface between entities external to the tokenization system and modules within the tokenization system. The interface module can provide a graphic user interface (GUI), for instance via a display of a client 110, and/or can provide a communicative interface, for instance configured to automatically route received sensitive data and/or token tables to modules within the tokenization system. The interface module can also provide an interface for communications between modules of the tokenization system, for instance by storing tokenized data within the tokenized data storage module. The interface module can also receive requests for tokenized data, for instance from a client, and can provide tokenized data to the client in response.

The tokenization module 125 is configured to receive sensitive data, to tokenize all or part of the received sensitive data, and to store or transmit the tokenized data. In the embodiments described herein, the tokenization module performs SLT tokenization, though it should be noted that other forms of tokenization can also be performed according to the principles described herein. The tokenization module selects one or more portions of the sensitive data to tokenize, and accesses one or more token tables stored in the token tables storage module 130 for use in tokenization. In some embodiments, the tokenization module requests, via the interface module 120, one or more token tables from the token server 115. Token tables received from the token server can be stored in the token tables storage module for future use. It should be noted that in some embodiments, the token server periodically updates the token tables stored in the token tables storage module without prompting by the tokenization module.

Upon accessing the one or more token tables, the tokenization module 125 replaces the one or more selected portions of the sensitive data with one or more tokens mapped to the values of the one or more selected portions within the accessed token tables to create tokenized data. The tokenization can then transmit the tokenized data to an external entity (such as a client 100, a bank, payment processor, retailer, financial institution, and the like), or can store the tokenized data in the tokenized data storage module 135.

In some embodiments, the tokenization module 125 can use an IV to tokenize the sensitive data, as described above. For example, the tokenization module 1) uses a first portion of the sensitive data to identify a token table stored in the token tables storage module 130, 2) uses a second portion of the sensitive data to access an IV from an IV table, 3) modifies a third portion of the sensitive data using the accessed IV, 4) queries the identified token table using the modified third portion of data to identify a token, and 5) replaces the third portion of data within the sensitive data with the identified token to form tokenized data. The tokenization module can also perform chained tokenization, for instance by tokenizing a first portion of the sensitive data using a token table selected with a second portion of the sensitive data to form first tokenized data, and tokenizing a portion of the first tokenized data using a second token table selected with a third portion of the sensitive data to form second tokenized data. IVs and IV tables can be received from the token server 115, or can be generated based on portions of the sensitive data and/or other tokenization parameters, and can be stored by the tokenization system 100 for subsequent use. Additional details of the types and methods of tokenization performed by the tokenization module are described below in greater detail.

Table-Connected Tokenization

Figure 2A:
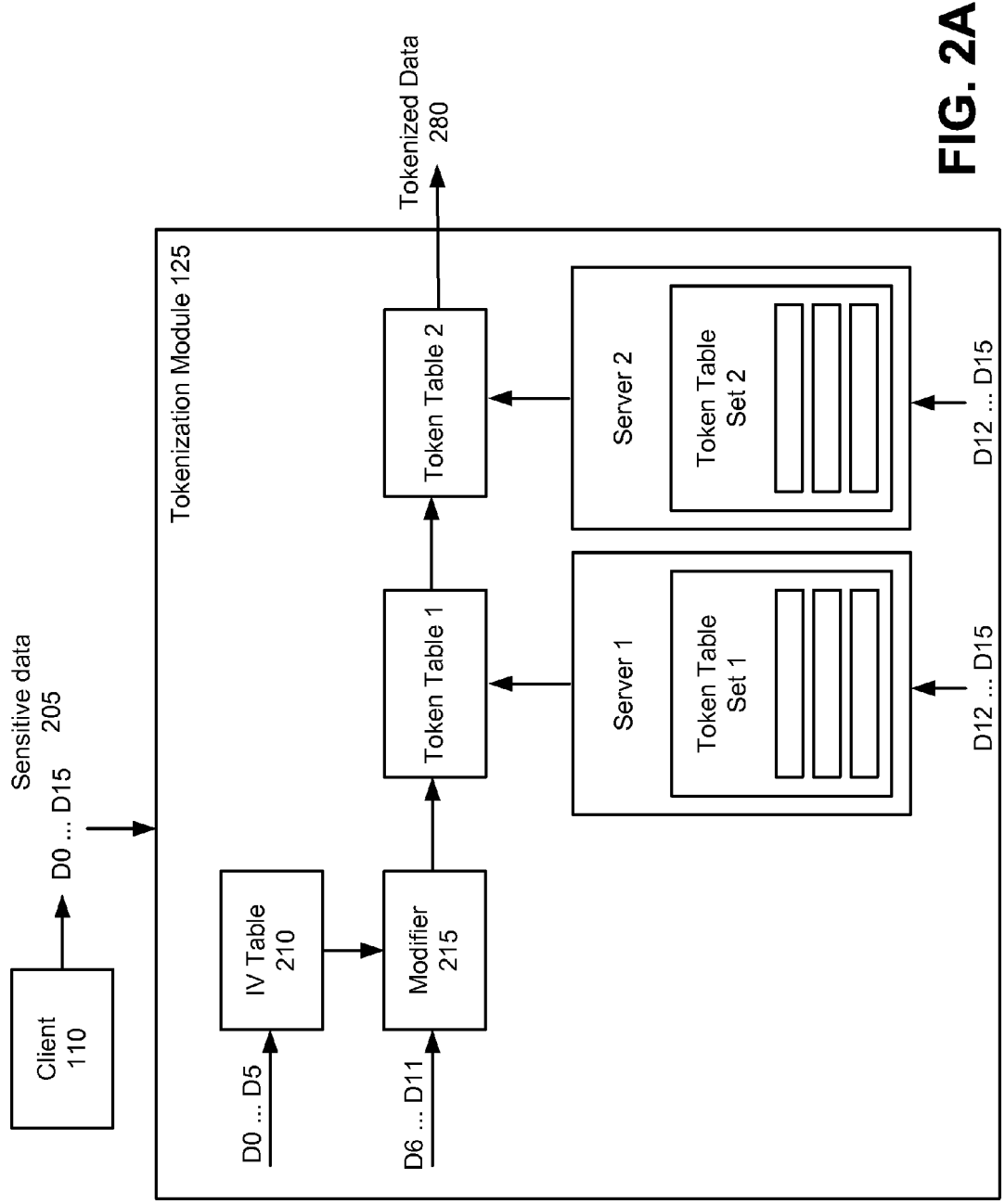
Figure 2C:
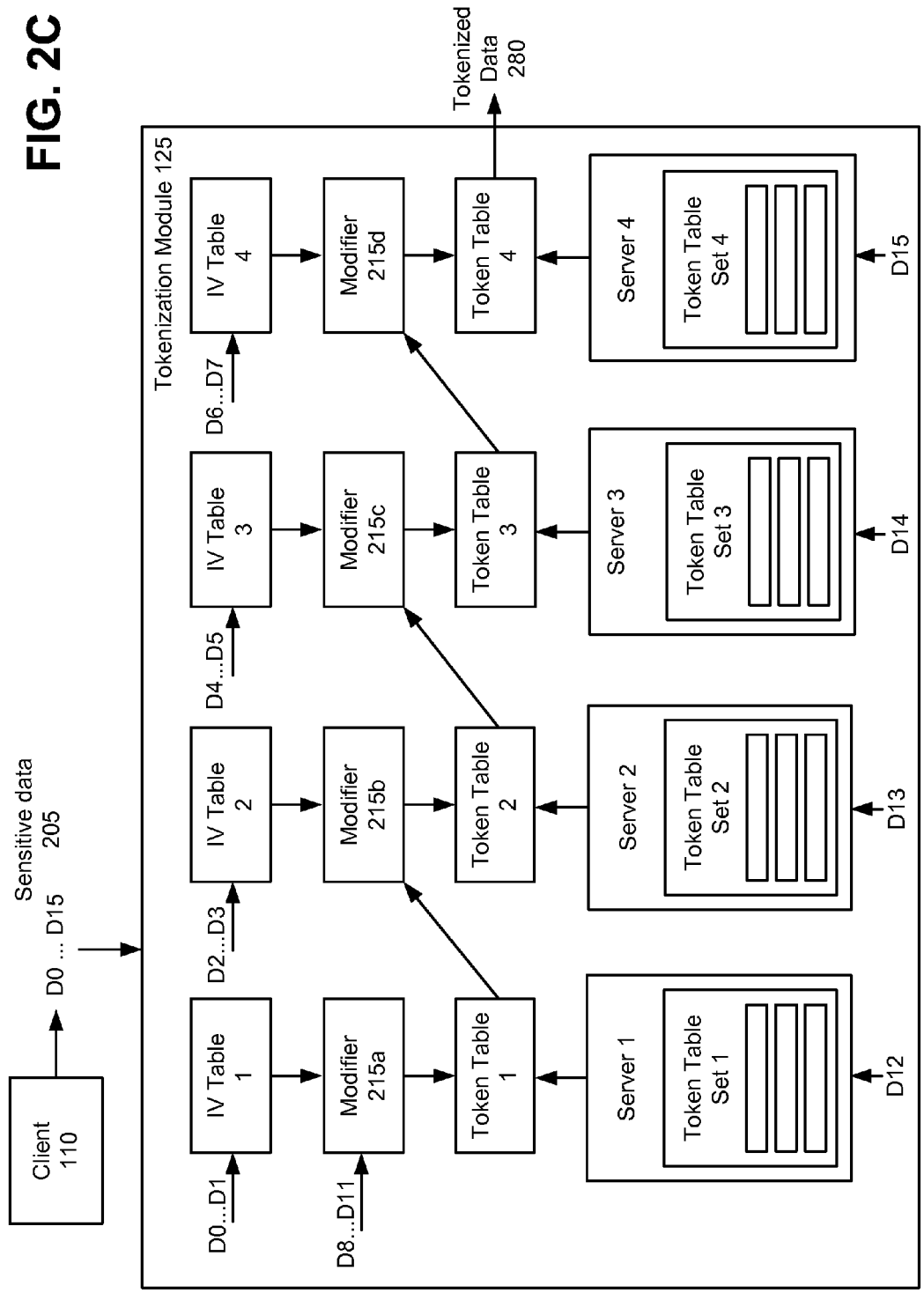

FIGS. 2a-2c illustrate examples of data flow within the tokenization system of FIG. 1, according to one embodiment. In these examples, multiple token tables are used to tokenize sensitive data. The tokenization module 125 receives sensitive data 205 from a client 110. In these embodiments, the sensitive data 205 is numerical, and includes 16 digits: D0, D1, D2 ... D15. The sensitive data 205 can be parsed into two or more portions. For example, in FIG. 2a, the sensitive data is parsed into portion 1 comprising elements D0-D5, portion 2 comprising elements D6-D11 and portion 3 comprising elements D12-D15. In this example of a 16 digit string such as "123456 223344 1234", portion 1 includes the string "123456", portion 2 includes the string "223344" and portion 3 includes the string "1234", though other portioning may be used.

In the example of FIG. 2a, one or more portions of the sensitive data are used to access IVs from an IV table 210. In one instance, a portion of the sensitive data 205 comprising elements D0-D5 is used to query the IV table 210 to access IVs. The accessed IVs can instead be received from an external entity configured to provide IVs for use in tokenization (such as the token server 115 of FIG. 1), or can be generated based on, for instance, the identity of a user, the date/time of a requested tokenization operation, based on various tokenization parameters, and the like. For example, if D0 ... D5 of the sensitive data 205 includes the string "123456", the IV table 210 can output the IV mapped to the index column value "123456". For example, the IV mapped to index "123456" can be "2653", which is outputted by the IV table upon being queried with the input value "123456". In another example, different portions of D0 ... D5 can each be used to access an IV from a different IV table. As noted above, an IV table can have an index column and multiple IV columns, each including a value mapped to each index value. Querying such an IV table with D0 ... D5 results in the outputting of an IV mapped to the index column entry with a value of D0 ... D5 for each IV column. Thus, the IV table can have the values "33456", "44356" and "32697" all mapped to the index "123456". On receiving the input of "123456" the IV table can randomly select any one of "33456", "44356" or "32697" for outputting.

One or more portions of the sensitive data are pre-processed prior to tokenization using the accessed one or more IVs to generate modified data. For example, a portion of the sensitive data can be modified by performing linear or modulus addition between an IV and portions of the sensitive data, performing logical operations on portions of the sensitive data using the IV, encrypting portions of the sensitive data using the IV as an encryption key. In the embodiment of FIG. 2a, D6 ... D11 is modified by the pre-processing module 215 using IVs from the IV table 210 to generate modified data. For example, an IV can include the string "815791", and the D6 ... D11 can include the string "223344". D6 ... D11 can be modified by performing modulo addition between corresponding digits of 815791 and 223344 to give a modified data value of 038035.

Portions of the sensitive data 205 can be used to select a token table from a set of token tables. In the embodiment of FIG. 2a, a portion of the sensitive data 205 including digits D12 ... D15 is used to select a token table from a set of token tables located at each of server 1 and server 2. With respect to FIG. 2a, token table 1 and token table 2 are retrieved from token table set 1 and token table set 2, respectively. Token table sets 1 and 2 can include a unique plurality of token tables. Any suitable method of selecting a token table from a token table set using a portion of the sensitive data 205 can be used. For instance, if the value of D12 ... D15 is the string "1234", a token table associated with the index value "1234" can be selected as token table 1.

As noted above, the token table sets can be stored in one or more servers. For example, token table set 1 can be stored on server 1, and token table set 2 can be stored on server 2. In one embodiment, to increase security, the token table sets are stored in physically separate servers. The physical separation of servers can prevent an unauthorized entity with access to a first of the token servers from accessing a second of the token servers. Each server can store any number of tables (such as 1000 or 50,000 token tables) organized into any number of sets (such as 10 or 500 sets, each including any number of tokens). Security can be further improved by using a different token generation method to generate token tables at each server. In such instances, the compromise of the token generation method at one server does not compromise the token tables at another server.

The data modified by the pre-processing module 215 is used to query token table 1. In response to being queried, the token table 1 outputs a token mapped to the value of the modified data. For example, the modified data can include the string "24532", and the token mapped to the input value "24532" is output by the token table 1. The token output by the token table 1 is used to query the token table 2 and the token table 2 outputs a second token mapped to the value of the token output by the token table 1. The sensitive data can then be tokenized to form tokenized data 280 by replacing a portion of the sensitive data with the second token. In the embodiment of FIG. 2a, the digits D6 . . . D11 are replaced with the second token to form the tokenized data 280.

It should be noted that tokens can be selected from the token tables in other ways than those described herein, for instance by querying a token table with only a portion of D6 . . . D11. In some embodiments, a token table can have an index column and multiple tokens mapped to each index column entry. In such embodiments, each token mapped to each index column entry can be used to modify a different portion of the sensitive data 205, or each token can be used to query a different token table to identify additional tokens for use in tokenizing the sensitive data.

It should also be noted that in alternative embodiments, permutations of the operations illustrated in FIG. 2a can be implemented. For instance, multiple IV tables can be queried with different portions of the sensitive data (e.g., a first IV table can be queried with D0 . . . D1, a second with D2 . . . D3, and so on). Each retrieved IV can be used to modify different portions of the sensitive data used to query the token tables. For instance, a first IV can be used to modify D6 . . . D8, a second IV can be used to modify D9 . . . D10, and a third IV can be used to modify D11; the modified bits D6 . . . D11 can then be used to query a token table. In addition, although not illustrated in the embodiment of FIG. 2a, IVs can be used to modify tokens output by the token tables. For example, a first IV can be used to modify D6 . . . D11, a second can be used to modify the token output by token table 1 prior to querying token table 2, and a third can be used to modify the token output by token table 2. Such implementations of the tokenization system add additional security, as additional data modification and tokenization operations decrease the ability of an unauthorized entity from detokenizing tokenized data. Accordingly, a vast variety of configurations may be used to tokenize sensitive data. Once tokenized, the tokenized data can then be stored in the tokenized data storage module 135 and/or sent to a user or other entity requesting the tokenized data.

The embodiment of FIG. 2b illustrates a second example data flow within the tokenization module of FIG. 1. Similar to the embodiment of FIG. 2a, the tokenization module 125 of FIG. 2b receives sensitive data 205 from a client 110. An IV table 210 is queried with a first portion of the sensitive data, digits D0 . . . D5, and the IV table outputs two IVs in response to the query. For example, the IV table 210 can map two IVs to each possible input value, or can include multiple IV columns, and can output a first IV based on the value of D0 . . . D2 and a second IV based on the value of D3 . . . D5.

A first modifier 215a receives a second portion of the sensitive data, D6 . . . D11, and receives a first outputted IV from the IV table 210. The modifier 215a modifies all or part of D6 . . . D11 using the first IV (for instance, by performing modulo addition between D6 . . . D11 and the first IV) to form first modified data. The tokenization module 125 accesses a first token table by querying a first token table set, token table set 1, using a third portion of the sensitive data, D12 . . . D13. As with the embodiment of FIG. 2a, the token table set 1 is located on a first server, server 1. The server 1 selects token table 1 from the token table set 1 based on the value of D12 . . . D13. The token table 1 is queried with the first modified data, and a first token mapped to the value of the first modified data is output.

A second modifier 215b receives the first token and receives a second outputted IV from the IV table 210. The modifier 215b modifies the first token using the second IV to form second modified data. The tokenization module 125 accesses a second token table by querying a second token table set, token table set 2, using a fourth portion of the sensitive data, D14 . . . D15. As with the embodiment of FIG. 2a, the token table set 2 is located on a second server, server 2. The server 2 selects the token table 2 from the token table set 2 based on the value of D14 . . . 15. The token table 2 is queried with the second modified data, and a second token mapped to the value of the second modified data is output. The tokenization module 125 replaces the second portion of the sensitive data 205, D6 . . . D11, with the second token and outputs tokenized data 280.

The embodiment of FIG. 2c illustrates a third example data flow within the tokenization module of FIG. 1. Similar to the embodiment of FIG. 2a, in the embodiment of FIG. 2c, the tokenization module 125 receives sensitive data 205 from the client 110. The tokenization module 125 of FIG. 2c includes four IV tables: IV table 1, IV table 2, IV table 3, and IV table 4. IV table 1 is queried with a first portion of the sensitive data 205 (D0 . . . D1), and outputs a first IV. IV table 2 is queried with a second portion of the sensitive data (D2 . . . D3), and outputs a second IV. IV table 3 is queried with a third portion of the sensitive data (D4 . . . D5), and outputs a third IV. IV table 4 is queried with a fourth portion of the sensitive data (D6 . . . D7) and outputs a fourth IV.

The tokenization module 125 includes four servers: server 1, server 2, server 3, and server 4. Server 1 includes token table set 1, is queried with a fifth portion the sensitive data 205 (D12), and outputs a first token table, token table 1, based on the value of D12. Server 2 includes token table set 2, is queried with a sixth portion of the sensitive data (D13), and outputs a second token table, token table 2, based on the value of D13. Server 3 includes token table set 3, is queried with a seventh portion of the sensitive data (D14), and outputs a third token table, token table 3, based on the value of D14. Server 4 includes token table set 4, is queried with an eighth portion of the sensitive data (D15), and outputs a fourth token table, token table 4, based on the value of D15.

A first modifier, modifier 215a, receives a ninth portion of the sensitive data, D8 . . . D11, and receives the first IV output by the IV table 1. The modifier 215a modifies D8 . . . D11 using the first IV to produce first modified data. The token table 1 is queried with the first modified data to produce a first token (for instance, a token mapped to the value of the first modified data within the token table 1). A second modifier, modifier 215b, receives the first token and the second IV, and modifies the first token using the second IV to produce second modified data. The token table 2 is queried with the second modified data to produce a second token. A third modifier, modifier 215c, receives the second token and the third IV, and modifies the second token using the third IV to produce third modified data. The token table 3 is queried with the third modified data to produce a third token. A fourth modifier, modifier 215c, receives the third token and the fourth IV, and modifies the third token using the fourth IV to produce fourth modified data. The token table 4 is queried with the fourth modified data to produce a fourth token. The tokenization module 125 replaces D8 . . . D11 with the fourth token and outputs the result data as the tokenized data 280. It should be noted that in this embodiment as well as the embodiment of FIG. 2b, the modifiers can perform different types of modification (for instance, a first modifier can perform modulo addition using an IV as an addend, a second can perform encryption using the IV as an encryption key, and so on).

Accordingly, the various combinations of multiple IVs from multiple IV tables and multiple tokens from multiple token tables across multiple servers described herein can improve the security of a tokenization system by increasing the number of tokenization components that must be compromised before an unauthorized entity can detokenize data tokenized by the tokenization system. If one token table is compromised, the additional token tables and IV tables will also need to be compromised and used in the same combination as the tokenization operation in order for an unauthorized party to be able to access the sensitive data. In addition to these embodiments, any combination of IVs, IV tables, tokens, token tables, and sets of token tables can be used to tokenize data according to the principles described herein. Further, any combination of portions of sensitive data can be used to query IV tables, to select token tables, and to query token tables according to the principles described herein.

Figure 3:
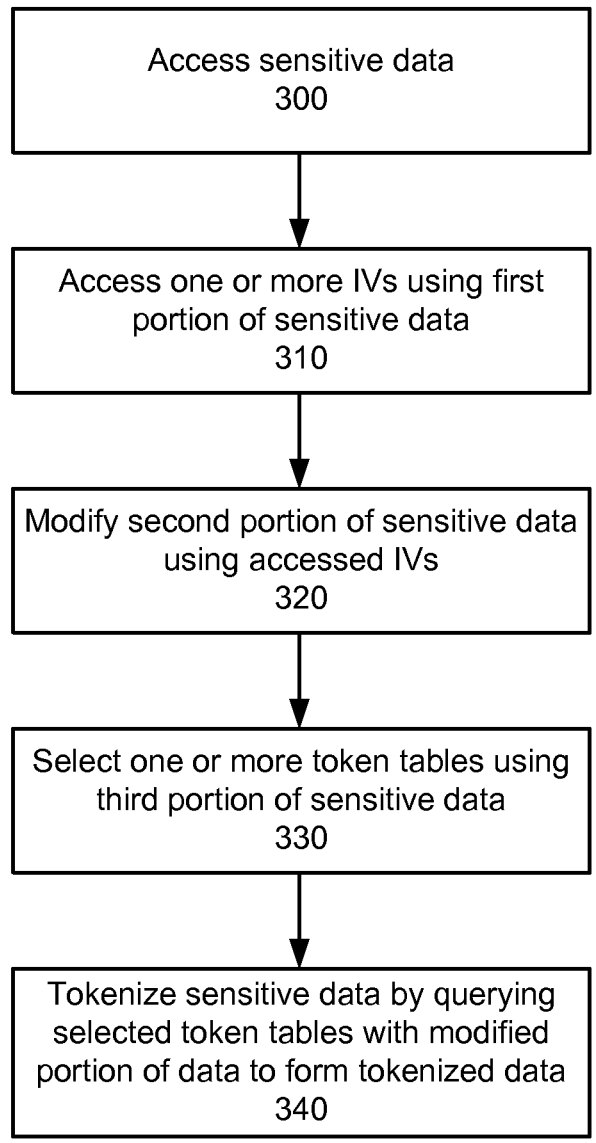
FIG. 3 is a flow chart of a tokenization operation process, according to one embodiment.

FIG. 3 is a flow chart of a tokenization operation process, according to one embodiment. Sensitive data is accessed 300. The sensitive data can be, for example, a credit card number or identification number. One or more IVs are accessed 310 using a first portion of the sensitive data. The one or more IVs can be accessed by querying one or more IV tables using the first portion of the sensitive data. A second portion of the sensitive data is modified 320 using the accessed IVs. For example, modulo addition can be performed using the second portion of the sensitive data and an IV to form modified data.

One or more token tables are selected 330 using a third portion of the sensitive data. For instance, a token table associated with the value of the third portion of the sensitive data can be selected from each of one or more sets of token tables. The sensitive data is tokenized 340 by querying the selected token tables with the modified portion of data to form tokenized data. For instance, a first token table can be queried with the modified portion of data to access a first token, a second token table can be queried with the first token to access a second token, and so forth until a final token table is queried to access a final token. The second portion of the sensitive data can be replaced with the final token to form tokenized data.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for tokenizing data, comprising:
   receiving sensitive data to be tokenized;
   querying an initialization vector table with a first portion of the sensitive data comprising less than all of the sensitive data to access an initialization vector;
   modifying, by one or more hardware processors, a second portion of the sensitive data different than the first portion of the sensitive data with the initialization vector;
   selecting a token table from a set of token tables based on a third portion of the sensitive data; and
   tokenizing, by one or more hardware processors, the modified second portion of the sensitive data using the selected token table.

2. The method of claim 1, wherein the sensitive data is one of: a password, a credit card number, a social security number, a bank account number, a driver's license number, information associated with a financial transaction, or date information.

3. The method of claim 1, further comprising querying one or more additional initialization vector tables with different portions of the sensitive data to access one or more initialization vectors.

4. The method of claim 1, wherein the initialization vector table comprises one or more initialization vector columns and an index column.

5. The method of claim 4, wherein one initialization vector in each initialization vector column is associated with each entry of the index column.

6. The method of claim 5, wherein querying an initialization vector table comprises determining an index column entry equal to the value of the first portion of the sensitive data to access the initialization vectors associated with the determined index column entry.

7. The method of claim 1, further comprising selecting one or more additional token tables from one or more additional token table sets based on one or more portions of the third portion of the sensitive data.

8. The method of claim 7, wherein each set of token tables is stored on a different server.

9. The method of claim 1, wherein tokenizing the modified second portion comprises querying the selected token table with the modified second portion to access a token mapped by the selected token table to an index value equal to the value of the modified second portion, and replacing the modified second portion with the accessed token.

10. The method of claim 1, wherein the first, second, and third portions of the sensitive data do not overlap.

11. A tokenization system comprising:
    an interface module configured to receive sensitive data to be tokenized; and
    a tokenization module comprising one or more hardware processors configured to tokenize the sensitive data by:
    querying an initialization vector table with a first portion of the sensitive data comprising less than all of the sensitive data to access an initialization vector;
    modifying a second portion of the sensitive data different than the first portion of the sensitive data with the initialization vector;
    selecting a token table from a set of token tables based on a third portion of the sensitive data; and
    tokenizing the modified second portion of the sensitive data using the selected token table.

12. The tokenization system of claim 11, wherein the sensitive data is one of: a password, a credit card number, a social security number, a bank account number, a driver's license number, information associated with a financial transaction, or date information.

13. The tokenization system of claim 11, wherein the tokenization module is further configured to query one or more additional initialization vector tables with different portions of the sensitive data to access one or more initialization vectors.

14. The tokenization system of claim 11, wherein the initialization vector table comprises one or more initialization vector columns and an index column.

15. The tokenization system of claim 14, wherein one initialization vector in each initialization vector column is associated with each entry of the index column.

16. The tokenization system of claim 15, wherein querying an initialization vector table comprises determining an index column entry equal to the value of the first portion of the sensitive data to access the initialization vectors associated with the determined index column entry.

17. The tokenization system of claim 11, wherein the tokenization module is further configured to select one or more additional token tables from one or more additional token table sets based on one or more portions of the third portion of the sensitive data.

18. The tokenization system of claim 17, wherein each set of token tables is stored on a different server.

19. The tokenization system of claim 11, wherein tokenizing the modified second portion comprises querying the selected token table with the modified second portion to access a token mapped by the selected token table to an index value equal to the value of the modified second portion, and replacing the modified second portion with the accessed token.

20. A method for tokenizing data, comprising:
    receiving sensitive data to be tokenized;
    selecting an initialization vector from a set of initialization vectors based on a first portion of the sensitive data comprising less than all of the sensitive data;
    selecting a token table from a set of token tables based on a second portion of the sensitive data; and
    tokenizing, by one or more hardware processors, a third portion of the sensitive data different than the first portion of the sensitive data and the second portion of the sensitive data using the selected token table and the selected initialization vector.

* * * * *